(12) United States Patent
Suzuki et al.

(10) Patent No.: US 7,099,607 B2
(45) Date of Patent: Aug. 29, 2006

(54) CARTRIDGE, AND TONER CONTAINER

(75) Inventors: Akira Suzuki, Kanagawa (JP); Osamu Anan, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 82 days.

(21) Appl. No.: 10/866,115

(22) Filed: Jun. 14, 2004

(65) Prior Publication Data

US 2005/0013628 A1    Jan. 20, 2005

(30) Foreign Application Priority Data

Jun. 18, 2003  (JP) .............................. 2003-172944

(51) Int. Cl.
*G03G 21/18* (2006.01)

(52) U.S. Cl. .................. 399/111; 222/DIG. 1

(58) Field of Classification Search ............... 399/111, 399/113, 114
See application file for complete search history.

(56) References Cited

U.S. PATENT DOCUMENTS

| | | | |
|---|---|---|---|
| 3,618,826 A * | 11/1971 | Kangas et al. ............... 222/166 |
| 4,181,549 A * | 1/1980 | McPhee ....................... 156/146 |
| 5,543,898 A | 8/1996 | Shishido et al. ............. 355/210 |
| 5,966,567 A | 10/1999 | Matsuzaki et al. .......... 399/111 |
| 6,144,815 A | 11/2000 | Chadani et al. .............. 399/27 |
| 6,154,623 A | 11/2000 | Suzuki et al. ................ 399/111 |
| 6,157,796 A * | 12/2000 | Fujiwara ...................... 399/106 |
| 6,173,140 B1 | 1/2001 | Suzuki et al. ................ 399/113 |
| 6,173,145 B1 | 1/2001 | Chadani et al. .............. 399/265 |
| 6,205,305 B1 | 3/2001 | Suzuki et al. ................ 399/106 |
| 6,219,504 B1 | 4/2001 | Matsuzaki et al. ............ 399/92 |
| 6,246,853 B1 | 6/2001 | Suzuki et al. ................ 399/262 |
| 6,282,389 B1 | 8/2001 | Matsuzaki et al. .......... 399/111 |
| 6,415,121 B1 * | 7/2002 | Suzuki et al. ................ 399/111 |
| 6,549,736 B1 | 4/2003 | Miyabe et al. ............... 399/111 |
| 6,654,578 B1 | 11/2003 | Suzuki et al. ................ 399/111 |
| 2001/0036989 A1 * | 11/2001 | Rohn et al. ................... 524/364 |
| 2002/0159787 A1 | 10/2002 | Chadani et al. .............. 399/109 |
| 2002/0159788 A1 | 10/2002 | Miyabe et al. ............... 399/109 |
| 2002/0191981 A1 | 12/2002 | Miyabe et al. ................ 399/90 |
| 2003/0113131 A1 | 6/2003 | Watanabe et al. ........... 399/111 |
| 2003/0161664 A1 | 8/2003 | Abe et al. .................... 399/176 |

FOREIGN PATENT DOCUMENTS

| | | |
|---|---|---|
| EP | 1 270 665 A1 | 1/2003 |
| JP | 5-263065 | 10/1993 |
| JP | 10-20744 | 1/1998 |
| JP | 2002-20703 | 1/2002 |

* cited by examiner

*Primary Examiner*—Arthur T. Grimley
*Assistant Examiner*—Laura K. Roth
(74) *Attorney, Agent, or Firm*—Fitzpatrick, Cella, Harper & Scinto

(57) ABSTRACT

A first component part formed of a first styrene resin composition and a second component part formed of a second styrene resin composition are fastened by solvent welding by means of a terpene type solvent, to provide a cartridge which is almost free of deformation at the peripheries of joints, has a high positioning precision for component parts and has a high rigidity.

28 Claims, 12 Drawing Sheets

CARTRIDGE, AND TONER CONTAINER

BACKGROUND OF THE INVENTION

1. Field of the Invention

This invention relates to a cartridge detachably mountable to an electrophotographic image forming apparatus employing electrophotography, such as a laser beam printer or a copying machine. Here, the electrophotographic image forming apparatus is one that forms images on a recording medium by using an electrophotographic image forming system. Then, as examples of the electrophotographic image forming apparatus, it includes, e.g., electrophotographic copying machines, electrophotographic printers (e.g., laser beam printers and LED printers), facsimile machines, and word processors. Incidentally, a process cartridge is one in which a charging means, a developing means or a cleaning means and an electrophotographic photosensitive member are integrally joined in a cartridge and this cartridge is set detachably mountable to the main body of the electrophotographic image forming apparatus.

2. Related Background Art

In conventional electrophotographic image forming apparatus making use of electrophotographic image forming processes, a process cartridge system is employed in which an electrophotographic photosensitive drum (hereinafter "photosensitive drum") and process means acting on the photosensitive drum are integrally joined in a cartridge and this cartridge is set detachably mountable to the main body of the electrophotographic image forming apparatus. In such a process cartridge system, a system is available in which, e.g., the photosensitive drum and at least one of a charging means, a developing means and a cleaning means or at least the developing means are integrally joined in a cartridge and this cartridge is set to be detachably mountable to the main body of the electrophotographic image forming apparatus.

According to the process cartridge system of this type, the apparatus can remarkably be improved in operability because its maintenance service can be performed by users themselves without relying on servicemen. Accordingly, this process cartridge system is widely used in the electrophotographic image forming apparatus.

The process cartridge is, to describe it with reference to FIGS. 15 and 16, commonly constituted of three frame members: a cleaning frame member 113, which integrally supports a photosensitive drum 107, a charging roller (not shown) and a cleaning blade (not shown); a developing frame member (not shown) which integrally supports a developing roller (not shown) and a developing blade (not shown); and a developer holding frame member (hereinafter "toner frame member") 111, which holds therein a toner. It is also constituted of side covers 190 and 191, which cover drive gear trains (not shown) at the sidewalls of the developing frame member and the toner frame member or either of them.

As means for fastening the above frame members and other component parts, commonly used are screws, heat caulking, resin joining (fastening by injection of molten resin) and so forth. Besides, as means for fastening component parts, employed are joining techniques, such as hot-melt bonding and ultrasonic welding (see, e.g., Japanese Patent Application Laid-open No. H10-20744).

However, such conventional joining techniques have had the following problems.

The cleaning frame member 113 is commonly provided with a cutout 101 in order that a photosensitive drum unit D integrally having a drum flange 136 and the photosensitive drum 107, the former receiving a driving force from the main body of an electrophotographic image forming apparatus, can readily be assembled to the cleaning frame member. As the result, there arises a problem that its periphery has a low rigidity. In some cases, it has been necessary to reinforce it with a rib. Where a drum bearing 138 is fastened with screws X to such a cleaning frame member, the area of a joint at which the cleaning frame member 113 and the drum bearing 138 are joined is defined substantially only by the screw's bearing surface (region d). Hence, the effect of enhancing the rigidity of the cleaning frame member may become poor also after the drum bearing 138 has been joined thereto. Moreover, in joining with screws, the joint position is limited in relation to space. In practice, the drum bearing 138 is often joined at a place separate from the part where the shaft of the drum unit D is received. In addition, since the joint area is also small as stated above, the positioning precision of the drum unit D tends to be low. There also have been such problems.

In order to improve the rigidity or improve the positioning precision, it is ideal that the drum bearing and the cleaning frame member are widely joined and also joined around the shaft of the photosensitive drum in an annular shape (or arc shape) after the shape of the shaft and that the drum bearing and the cleaning frame member stand integrated. However, where it is attempted to make the drum bearing and the cleaning frame member integrated by joining them both widely and around the shaft of the photosensitive drum in an annular shape (or arc shape) according to the conventional methods, e.g., by the resin joining (by injection of molten resin) or by injecting a hot melt, an adhesive or the like, there has been a problem that the peripheries of joints tend to deform under heat and pressure because, in injecting the molten resin or in injecting the hot melt, the joints must be heated to a high temperature at the time of injection in order to melt the material to be injected, or a high pressure is required in order to inject a highly viscous material. Also, in order to keep the peripheries of joints from deforming, there has also been a case in which a large-size jig holding the drum bearing and the cleaning frame member is provided. Incidentally, the improvement of the rigidity and the improvement of the positioning precision are likewise required also when the developing frame member, the toner frame member or the side cover are joined.

A case in which the frame members (and component parts) are joined using a material different from materials for them, such as hot melts, adhesives or the like, is undesirable because such a case is disadvantageous in regard to the recycling of materials after cartridges having been used are collected and there is a possibility of causing a lowering of quality such as a lowering of mechanical physical properties and flame retardance of recycled materials (regenerated materials).

Reference is made below in regard to terpene compounds.

As known in the art, compounds of a terpene type are the principal components of essential oils obtained chiefly by steam distillation of vegetables and are commonly used as perfumes.

Meanwhile, the terpene compounds are also known to have uses other than the above. For example, d-limonene, which is a monoterpene, has a molecular structure very similar to that of styrene, and has the property of dissolving polystyrene even at normal temperature. Hence, as disclosed in Japanese Patent Application Laid-open No. H5-263065, it is used as a shrinking agent for foamed styrol.

Besides, as disclosed in Japanese Patent Application Laid-open No. 2002-20703, a technique is proposed in which the surface of a joining resin is dissolved with an additive containing limonene, and is further heated in a dissolved state to agitate the joining resin surface, in the state of which the joining resin is fused to what is intended.

SUMMARY OF THE INVENTION

An object of the present invention is to provide a cartridge and a toner container which are almost free of deformation at the peripheries of joints and have secured wide joint surfaces.

Another object of the present invention is to provide a cartridge and a toner container which have a high positioning precision for component parts and have a high rigidity.

Still another object of the present invention is to provide a cartridge and a toner container which are recyclable with ease.

A further object of the present invention is to provide a cartridge and a toner container which have employed a novel joining technique that enables utilization of a simple joining assembly.

The present invention provides a cartridge having at least a first component part formed of a first styrene resin composition and a second component part formed of a second styrene resin composition;

the cartridge being detachably mountable to the main body of an electrophotographic image forming apparatus;

the first styrene resin composition and/or the second styrene resin composition being a resin composition containing a flame retardant in an amount of from 4 parts by weight to 18 parts by weight based on 100 parts by weight of the styrene resin; and the first component part and the second component part having been joined having joint surfaces;

at least part of the joint surfaces having been fastened by solvent welding by means of a terpene type solvent.

The present invention also provides a cartridge having at least a first component part formed of a first styrene resin composition and a second component part formed of a second styrene resin composition;

the cartridge being detachably mountable to the main body of an electrophotographic image forming apparatus; and the first component part and the second component part having been joined having joint surfaces;

the joint surfaces having been fastened by solvent welding by means of a terpene type solvent; the terpene type solvent being fed to at least part of joint surfaces before fastening by solvent welding, in the state the joining surface in the first component part and the joining surface in the second component part are disposed in contact with or in proximity to each other.

The present invention still also provides a toner container having at least a first component part formed of a first styrene resin composition and a second component part formed of a second styrene resin composition;

the first styrene resin composition and/or the second styrene resin composition being a resin composition containing a flame retardant in an amount of from 4 parts by weight to 18 parts by weight based on 100 parts by weight of the styrene resin; and the first component part and the second component part having been joined having joint surfaces;

at least part of the joint surfaces having been fastened by solvent welding by means of a terpene type solvent.

The present invention further provides a toner container having at least a first component part formed of a first styrene resin composition and a second component part formed of a second styrene resin composition;

the first component part and the second component part having been joined having joint surfaces;

the joint surfaces having been fastened by solvent welding by means of a terpene type solvent; the terpene type solvent being fed to at least part of joint surfaces before fastening by solvent welding, in the state the joining surface in the first component part and the joining surface in the second component part are disposed in contact with or in proximity to each other.

DESCRIPTION OF THE PREFERRED EMBODIMENTS

Embodiments of the present invention are described below in detail with reference to the drawings.

In the following description, the lengthwise direction of an image bearing member and the lengthwise direction of a cartridge having a process means (hereinafter "process cartridge") that acts on the image bearing member refer to the direction that intersects the transport direction of a recording medium and is parallel to the recording medium.

(Description of Process Cartridge and Apparatus Main Body)

Figure 1:
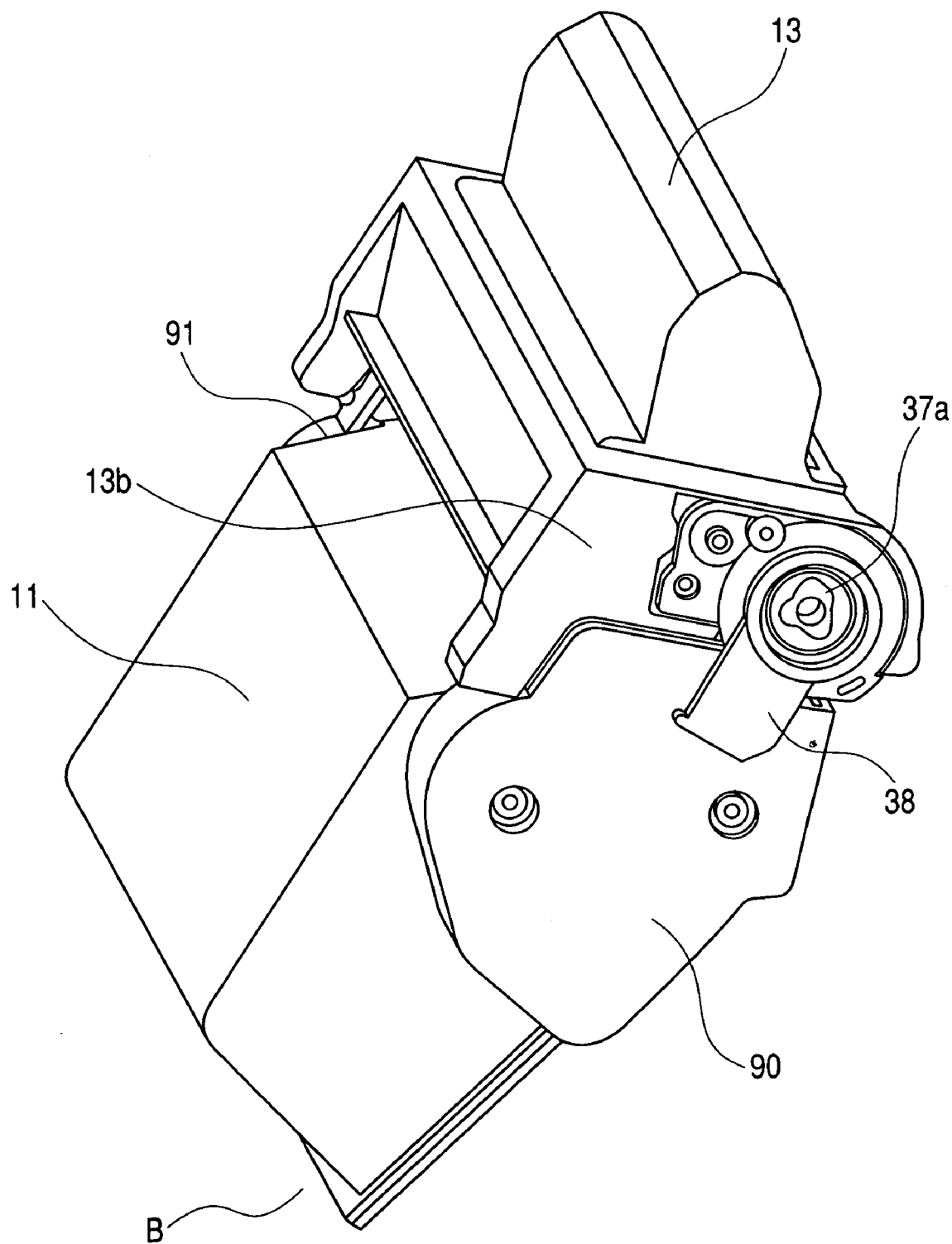
FIG. 1 is a perspective view of a process cartridge according to an embodiment of the present invention.
Figure 2:
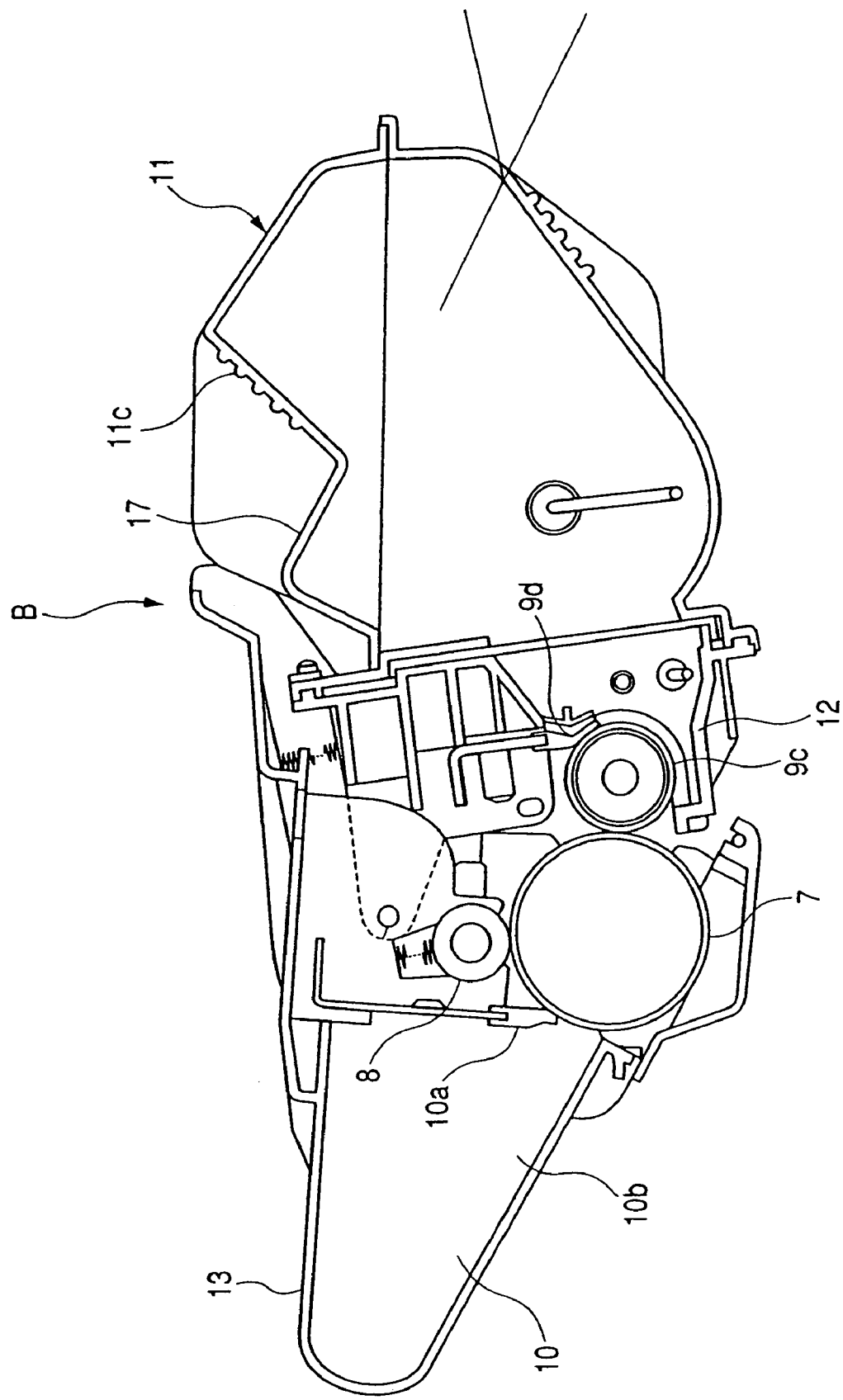
FIG. 2 is a main sectional view of the process cartridge according to an embodiment of the present invention.

FIG. 1 presents a perspective view of a process cartridge according to the present invention; FIG. 2, a main sectional view of the process cartridge according to the present invention; and FIG. 3, a main sectional view of an electrophotographic image forming apparatus (hereinafter "image forming apparatus") according to the present invention. This process cartridge has an image bearing member and a process means that acts on the image bearing member. Here, the process means includes, e.g., a charging means which charges the surface of the image bearing member electrostatically, a developing assembly which forms a toner image on the image bearing member, and a cleaning means for removing the toner having remained on the image bearing member surface.

A process cartridge B is chiefly constituted of, as shown in FIG. 2, a cleaning frame member 13 having an electrophotographic photosensitive drum (hereinafter "photosensitive drum" 7 which is the image bearing member, and provided around it a charging roller 8 which is the charging means and a cleaning blade 10a which is the cleaning means; a developing frame member having a developing assembly having a developing roller 9c and a developing blade 9d; and a developer holding frame member (hereinafter "toner frame member") 11 which holds therein a toner.

Besides the foregoing, it is also constituted of side covers 90 and 91 which cover drive gear trains (not shown) at the sidewalls of the developing frame member 12 and toner frame member 11 or either of these frame members (see FIG. 1).

Figure 3:
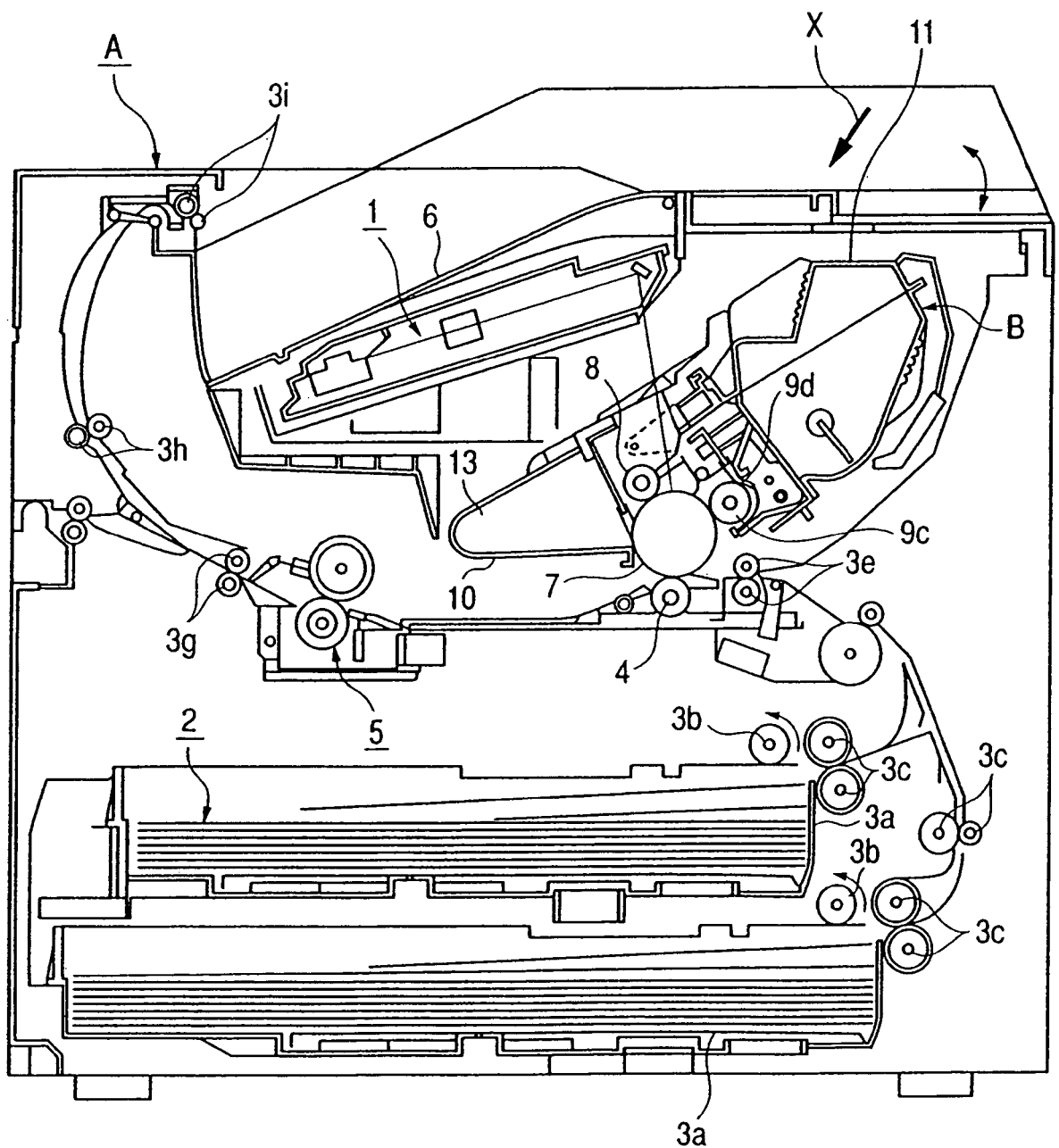
FIG. 3 is a main sectional view of an electrophotographic image forming apparatus according to an embodiment of the present invention.

This process cartridge B is set in such an image forming apparatus A as that shown in FIG. 3. A recording medium 2 is sent out by a pick-up roller 3b from a paper feed cassette 3a set at the lower part of the apparatus. Then, the recording medium 2 is transported by transfer rollers 3c, and by a registration roller 3e the recording medium 2 is made to stand by. In synchronization with this recording medium, a photosensitive drum 7 is subjected to selective exposure through an exposure unit 1 to form a latent image. Thereafter, a toner held in the toner frame member 11 is carried in thin layer on the surface of the developing roller 9c by the aid of the developing blade 9d, and a development bias is applied to the developing roller 9c, whereby the toner is fed to the photosensitive drum 7 in accordance with the latent image to form a toner image. At the same time as the formation of the toner image on the photosensitive drum 7, the recording medium 2 is sent out from the registration roller 3e to the part where a transfer roller 4 and the photosensitive drum 7 stand opposite each other. This toner image is transferred to the recording medium 2 being transported, by applying a bias voltage to the transfer roller 4. After the transfer, residual toner on the photosensitive drum 7 is removed by the cleaning means 10. Stated in detail, the toner having remained on the photosensitive drum 7 is scraped off by the cleaning blade 10a and also scooped by a scoop sheet (not shown), and the toner scraped off is collected in a waste toner holder 10b. Thus, the cleaning is performed. Also, the recording medium 2 to which the toner image has been transferred is transported to a fixing assembly 5, where the toner image is fixed, and this recording medium is delivered by delivery rollers 3g, 3h and 3i to a delivery tray 6 at the upper part of the apparatus.

(Drive Transmission Mechanism of Drum)

The structure of a coupling means is described below which is a driving force transmission mechanism which transmits a driving force from the image forming apparatus main body A to the process cartridge B.

Figure 5:
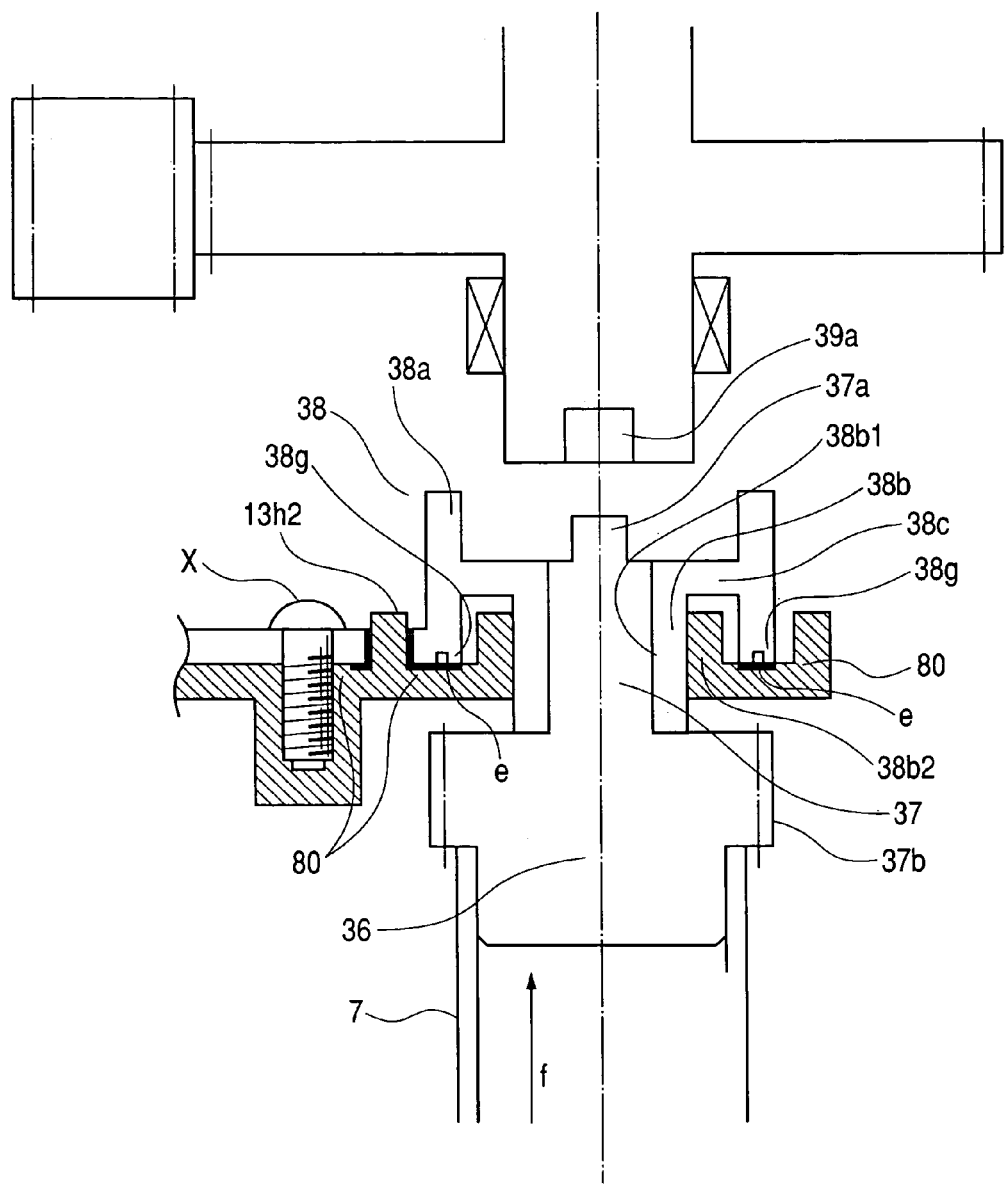
FIG. 5 is a partial vertical section of the process cartridge according to an embodiment of the present invention.
Figure 6:
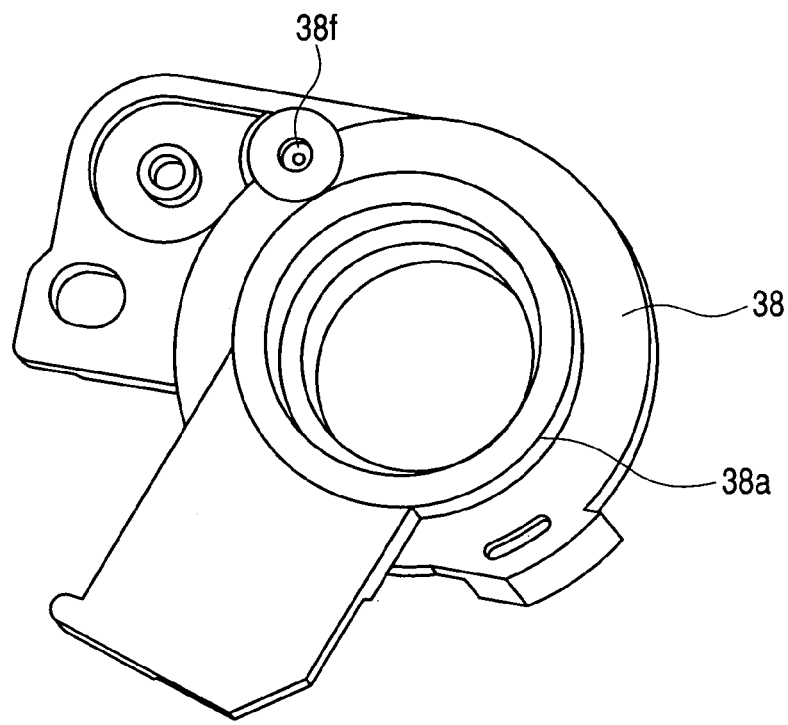
FIG. 6 is an enlarged view of a component part of the process cartridge according to an embodiment of the present invention.

FIG. 5 is a vertical section of a coupling portion showing how the photosensitive drum 7 stands attached to the process cartridge B. As shown in FIG. 5, the photosensitive drum 7 attached to the process cartridge B is provided, at its one end in the lengthwise direction, with a cartridge side coupling means. This coupling means is one in which a drum flange 36 attached at one end of the photosensitive drum 7 is provided with a coupling protrusion shaft 37 (columnar shape), and a protrusion 37a is formed at the end face of the coupling protrusion shaft 37. Here, the end face of the protrusion 37a is parallel to the end face of the coupling protrusion shaft 37. This coupling protrusion shaft 37 is also fitted to the bearing portion 38b1 of the drum bearing 38 to function as a drum rotating shaft. Then, in this embodiment, the drum flange 36, the coupling protrusion shaft 37 and the protrusion 37a are integrally provided. Then, the drum flange 36 is integrally provided with a helical drum gear 37b which engages with a developing roller gear (not shown) fastened coaxially to the developing roller 9c inside the process cartridge B. Thus, as shown in FIG. 5, the drum flange 36 is an integral molded product having the drum gear 37b, the coupling protrusion shaft 37 and the protrusion 37a, and is a driving force transmission component part having the function to transmit driving force.

(Joining of Cleaning Frame Member and Drum Bearing; Embodiment 1)

Figure 4:
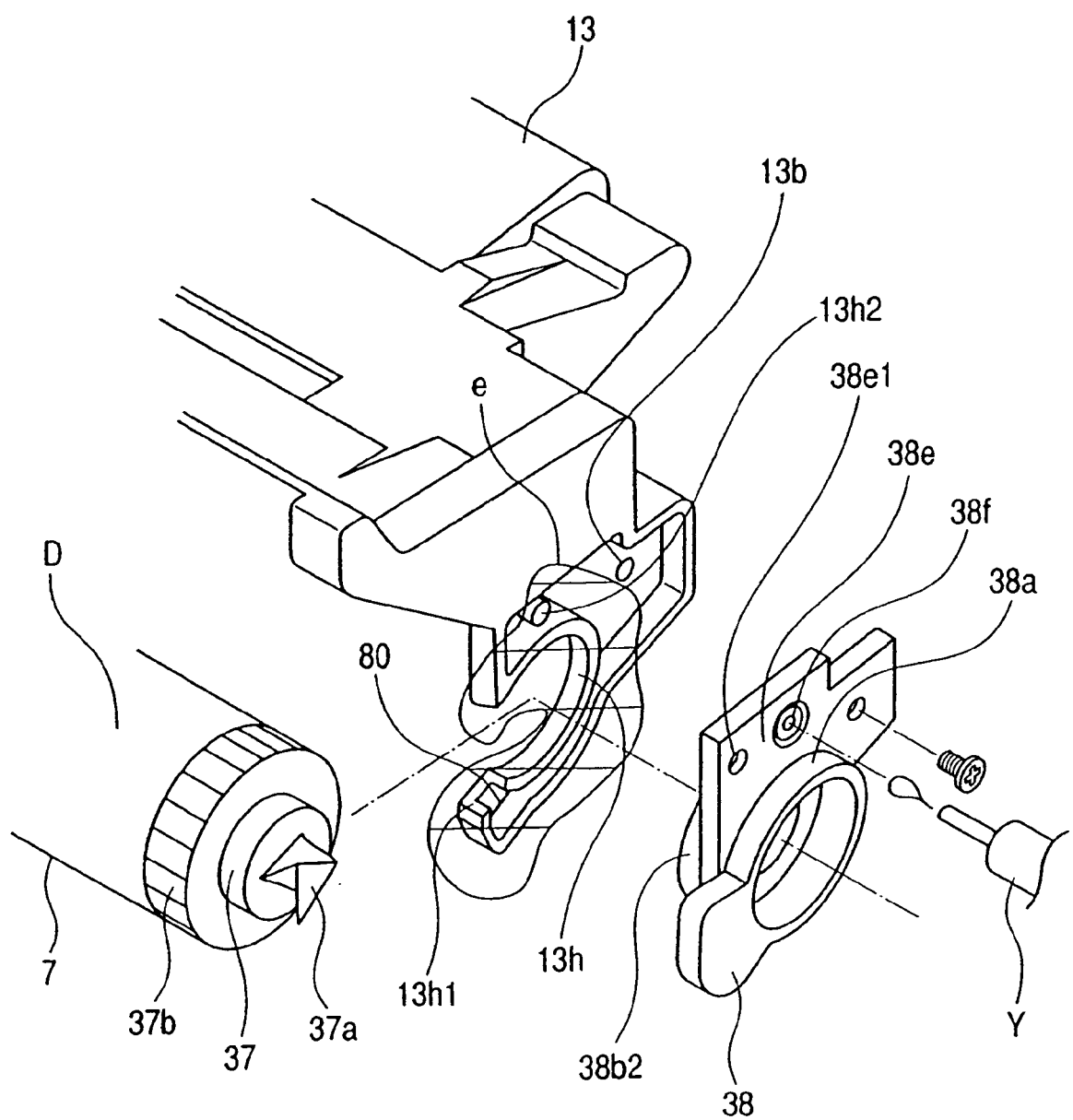
FIG. 4 is a schematic perspective view showing a partial structure of the process cartridge according to an embodiment of the present invention.

FIG. 4 is a perspective view showing in detail the relationship of attachment between the drum bearing 38 (first component part), which supports the photosensitive drum, and the cleaning frame member 13 (second component part). The attaching of the drum bearing 38 to the cleaning frame member 13 and the attaching of a unitized photosensitive drum unit D to the cleaning frame member 13 are specifically described below.

The drum bearing 38 is, as shown in FIGS. 4 and 5, integrally provided with a large-diameter protrusion 38a and a small-diameter protrusion 38b. This small-diameter protrusion 38b is connected with an end of a disk portion 38c at the middle of the large-diameter protrusion 38a in its axial direction (lengthwise direction). The cleaning frame member 13 is, as shown in FIG. 4, provided on a sidewall 13b thereof with a bearing attaching hole 13h into which an outer peripheral portion 38b2 of the small-diameter protrusion 38b of the drum bearing 38 is inserted. The bearing attaching hole 13h has a broken-ring portion 13h1. The broken-ring portion 13h1 has a broken-ring end-to-end distance smaller than the diameter of the bearing attaching hole 13h, and this distance is larger than the diameter of the coupling protrusion shaft 37. Also, the coupling protrusion shaft 37 is fitted to an inner peripheral portion 38b1 of the small-diameter protrusion 38b of the drum bearing 38. The cleaning frame member 13 is integrally provided on the sidewall 13b thereof with a positioning pin 13h2 which is so made as to be closely fitted to a hole 38e1 made in the drum bearing 38. Also, the lengthwise position of the drum bearing 38 and cleaning frame member 13 is determined by a bottom end face (standard) 80.

Being made up as described above, the unitized photosensitive drum 7 can be attached to the cleaning frame member 13 in the axial direction (lengthwise direction) from the crosswise direction, and also the drum bearing 38 is relatively positioned to the cleaning frame member 13 when the drum bearing 38 is attached to the cleaning frame member 13.

To attach the unitized photosensitive drum 7 to the cleaning frame member 13, the photosensitive drum 7 is moved in the lengthwise direction and in the crosswise direction as shown in FIG. 4, and the coupling protrusion shaft 37 is passed through the broken-ring portion 13h1 and inserted into the bearing attaching hole 13h in such a way that the drum gear 37b stays in the cleaning frame member 13. In this state, the drum bearing 38 is moved in the axial direction to fit a bearing portion 38b, to the coupling protrusion shaft 37, and is further moved in the axial direction to fit the bearing portion 38b to the bearing attaching hole 13h of the cleaning frame member 13, where the drum bearing 38 is screwed to the cleaning frame member 13.

After the unitized photosensitive drum 7 has been attached to the cleaning frame member 13 by screwing, a terpene type solvent is fed to the joint between the cleaning frame member 13 and the drum bearing 38 through a terpene type solvent injection portion 38e formed on the drum bearing 38 and having an injection opening 38f. The solvent thus fed passes through a line cut (slit) 38g and spreads over the joint; the line cut 38g being provided on the back of the drum bearing 38, communicating with the injection opening 38f and forming a flow path through which the terpene type solvent is fed to joint surfaces (see FIGS. 5, 6, 7 and 10).

The feeding of the terpene type solvent to the joint (joint surfaces) may preferably be done by capillary action, and the line cut 38g which is a flow path extending from the terpene type solvent injection portion 38e to the joint may preferably be from 0.1 mm to 2 mm in width (more preferably from 0.1 mm to 1 mm) and from 0.1 mm to 2 mm in depth (more preferably from 0.1 mm to 1 mm). The flow path formed by the line cut 38g may preferably be 4 mm$^2$ or less in sectional area (more preferably 1 mm$^2$ or less). A flow path of more than 4 mm$^2$ in sectional area may make the capillary action not readily take place, to tend to make it difficult to feed the terpene type solvent to joint surfaces.

The flow path may be divided into a first flow path extending from the injection portion to the vicinity of the joint and a second flow path extending from the vicinity of the joint to the joint.

Figure 11:
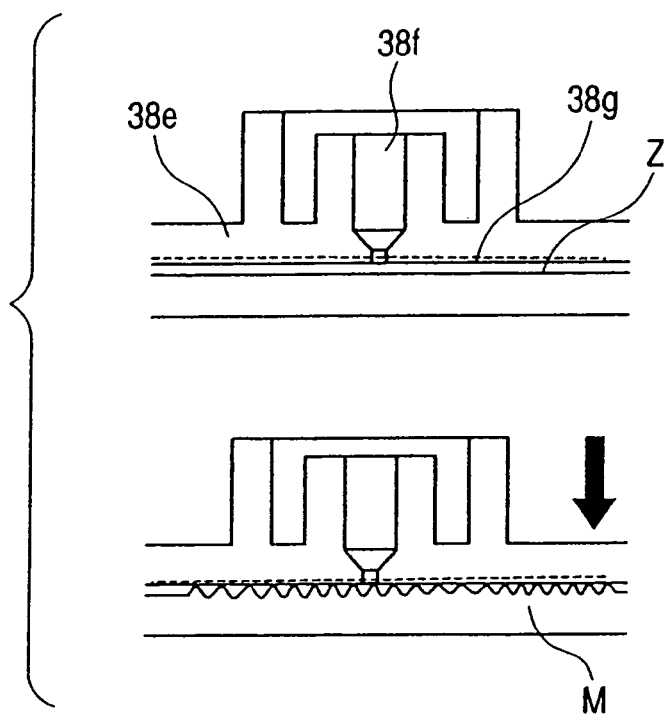
FIG. 11 is a partial vertical section of the process cartridge according to an embodiment of the present invention.
Figure 12:
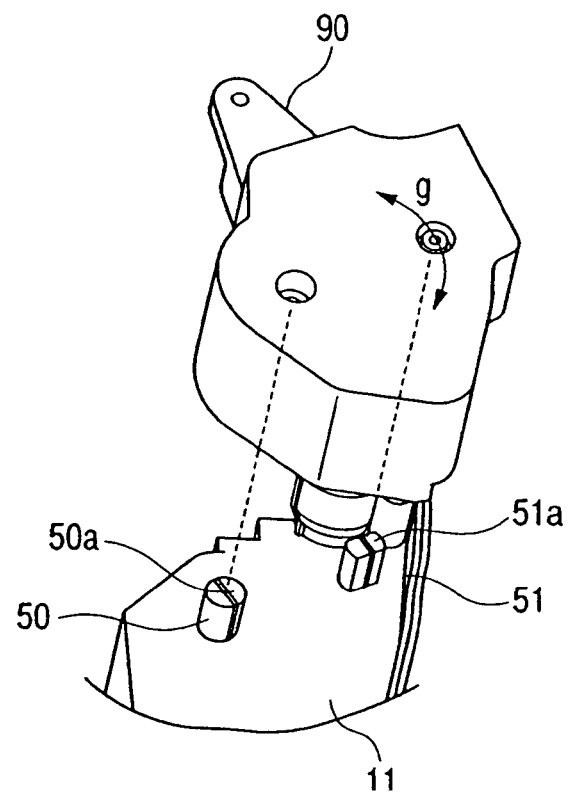
FIG. 12 is a schematic perspective view showing a partial structure of the process cartridge according to an embodiment of the present invention.

When the solvent having passed through the flow path spreads over the whole joint surfaces, to be described with reference to FIG. 11, it is difficult for the terpene type solvent to be fed to a joint region e (FIGS. 4 and 5) by utilizing capillary action if a gap Z between the joining component parts is large. If, on the other hand, the surfaces to be joined are strongly pressed against each other (contact pressure is about 20 g/cm$^2$) and have high contact strength, the capillary action can not readily take place to make it difficult to feed the terpene type solvent. Accordingly, the portions to be joined may preferably be in proximity to, or in light contact with, each other. Thus, it is also a preferred embodiment that at least one of the joint surfaces is provided with fine unevenness (M in FIG. 11) and a space is provided so that the solvent can spread over the contact portion by capillary action.

The above unevenness may comprise, e.g., embosses (or impressions), which may preferably have a depth of from 20 μm to 40 μm as average roughness (Rz). If their depth is more than 40 μm, one component part may insufficiently be joined to the other component part at valleys of the embosses, and hence the join strength tends to decrease as a whole. Where the depth of embosses is from 20 μm to 40 μm, the join strength is little seen to decrease even under the application of a load of 150 g/cm$^2$.

Figure 8:
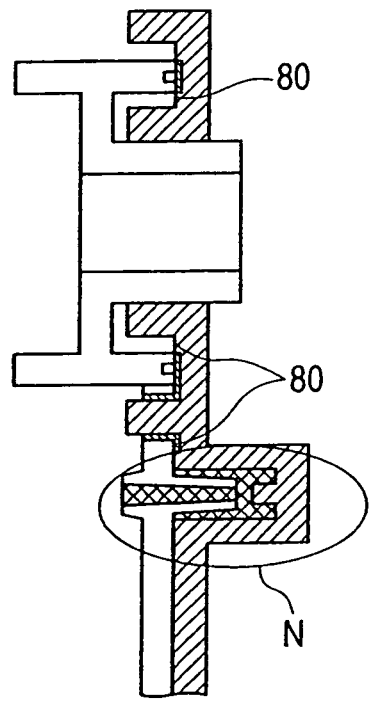
FIG. 8 is a partial vertical section of the process cartridge according to an embodiment of the present invention.

When the component parts are joined with the terpene type solvent, it takes some time until the two component parts are finally joined (e.g., a few minutes to tens of minutes when d-limonene is used). Hence, they may further optionally be screwed in the manner as described above, or, as shown in FIG. 8, a resin joint N may be provided to join them (a molten resin is injected to the part between the two component parts to join them). This can keep the joint from coming off before the two component parts are completely joined with the terpene type solvent.

Figure 9:
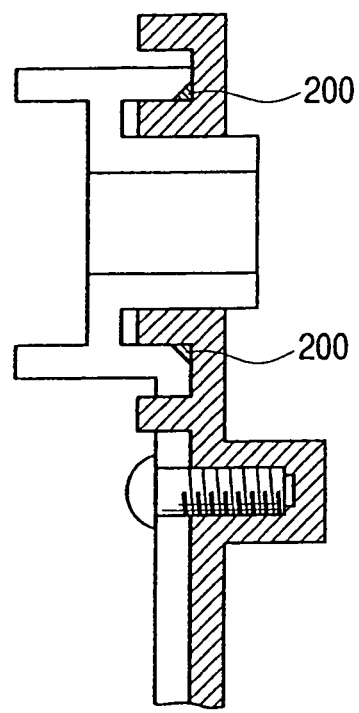
FIG. 9 is a partial vertical section of the process cartridge according to an embodiment of the present invention.
Figure 10:
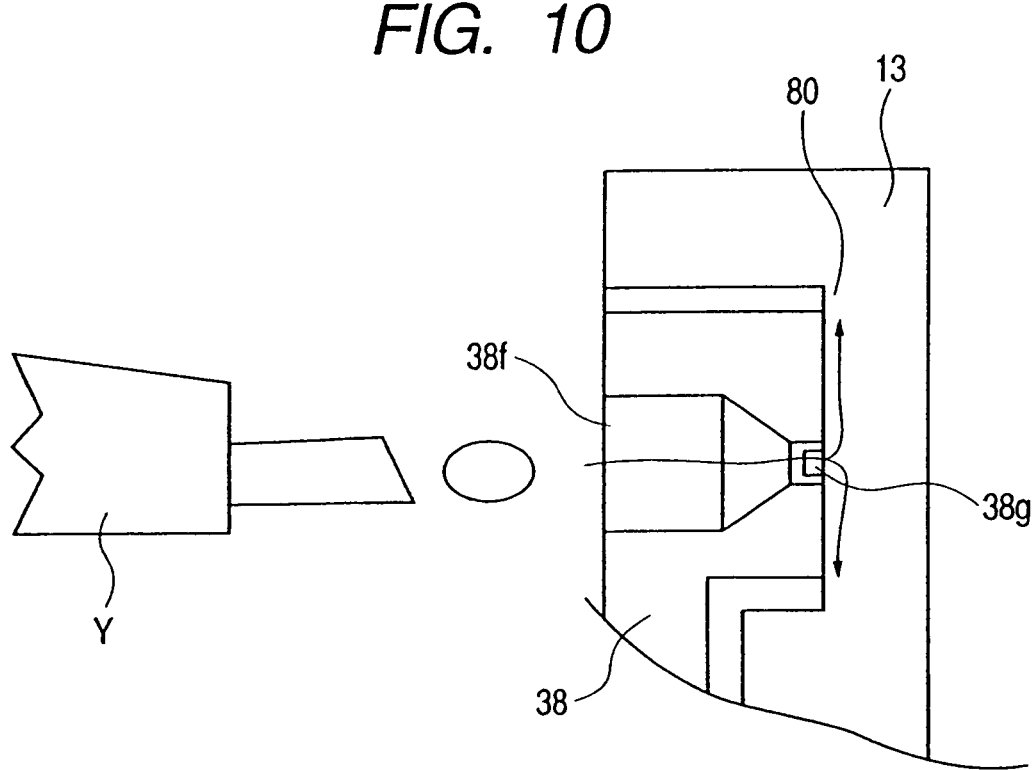
FIG. 10 is a partial vertical section of the process cartridge according to an embodiment of the present invention.

Instead of providing the drum bearing with the line cut, the drum bearing may be beveled as shown in FIG. 9 (reference numeral 200). Also when the flow path of the terpene type solvent is formed by such beveling, the preferred sectional area is like that where the line cut is provided.

In the present invention, the two component parts are joined at the joint region e (see the shaded area on FIG. 4 and the thick-line portion on FIG. 5) in an arc shape, which has not been joined in conventional cases, in a wide range and around the drum center. Hence, the cleaning frame member and the drum bearing become integral to enhance the rigidity.

The coupling protrusion 37a and a coupling recess 39a (FIG. 5), which are driving force transmission members, have a twisted shape. When the process cartridge is mounted, the force by which the coupling recess 39a provided on the apparatus main body A side draws the protrusion 37a acts as a pressing force which is produced in the direction of an arrow f and makes the sidewall 13b of the cleaning frame member 13 come into contact with the inner wall (not shown) of the apparatus main body A. In the process cartridge of the present invention, the cleaning frame member 13 and the drum bearing 38 are set integral to enhance the wall rigidity of the sidewall 13b. Thus, the sidewall 13b can be kept from deforming because of such a pressing force. This can keep the rotational shaft of the photosensitive drum 7 from run-out and enables the photosensitive drum 7 to be stably rotated. Further, the sidewall 13b at the part where the drum bearing 38 having the cylindrical guide 38a is attached to the cleaning frame member 13 can have a higher rigidity, so that the precision of positioning of the process cartridge B to the apparatus main body A can be improved.

The terpene type solvent used in joining the cleaning frame member and the drum bearing is described below.

The terpene type solvent used in the above joining (solvent welding) may include, e.g., d-limonene, l-limonene, dl-limonene, d-α-pinene, d-β-pinene, α-terpinene, β-terpinene, γ-terpinene, terpinolene, 2-carene, d-3-carene, 1,3-carene, and phellandrene. In particular, d-limonene, l-limonene or dl-limonene may preferably be used, and d-limonene may particularly preferably be used. The d-limonene has a viscosity of 0.98 cP at 25° C., which is substantially the same as that of water, and hence can be fed by capillary action by which it permeates fine spaces.

As the terpene type solvent, a solvent may also be used which is prepared by beforehand dissolving polystyrene in the terpene type solvent. As long as it is one in which the polystyrene has been dissolved in an amount of about ten-odd % by weight, substantially the same effect as that in the case of the terpene type solvent alone is obtainable with respect to join (solvent welding) strength. If, however, polystyrene is dissolved in a large quantity, the solvent may have a high viscosity to tend to make the capillary action not readily take place.

A solvent mixed with other material may also be used, as exemplified by an IPA (isopropyl alcohol) and d-limonene mixed solvent. Its use can shorten the time until the two component parts are completely joined.

In the present invention, the terpene type solvent may be used in a very small amount of about 0.01 ml, and dissolves only surface layers of the frame member and other component part to be joined. Thereafter, the terpene type solvent evaporates and diffuses to disappear from the joint, and the two component parts intended to be joined are joined.

In the present invention, what has led the terpene type solvent (e.g., d-limonene) to its use in the joining of the two component parts of the cartridge is that the present inventors have taken note of the mechanism by which the terpene type solvent dissolves styrene resin compositions. Accordingly, the frame members and component parts to be joined must be styrene resin compositions. The first component part (such as the drum bearing) is formed of a first styrene resin composition and the second component part (such as the cleaning frame member) is formed of a second styrene resin composition. Incidentally, the first styrene resin composition and second styrene resin composition in the present invention may be those compositionally identical or different.

There are no particular limitations on the styrene resin compositions as long as they are dissolvable with the terpene type solvent. Styrene resin compositions usable preferably as materials for the cartridge may include HIPS (high-impact polystyrene), which is a rubber modified styrene material. This material is one obtained by mixing a rubbery polymer or rubbery copolymer in PS (polystyrene), which is inexpensive and has good fluidity, in order to improve impact resistance.

In the present invention, as the HIPS (high-impact polystyrene), it is preferable to use one obtained by mixing a rubbery polymer or rubbery copolymer having an average particle diameter of from 0.5 μm to 3.0 μm. This is because, if the rubbery polymer or rubbery copolymer to be mixed has too small an average particle diameter, poor external appearance (such as scratches) may come about when the cartridge component parts are molded, and, if on the other hand it has too large an average particle diameter, a toner seal member (not shown) tends to have a low solvent weldability. As the rubbery polymer or rubbery copolymer, preferably usable are polymers selected from the group consisting of polybutadiene, a styrene-butadiene copolymer, polyisoprene, a butadiene-isoprene copolymer, natural rubber and an ethylene-propylene copolymer.

The frame member (container) is also required to have a UL-94 V2-rank flame retardance as safety from fire. Accordingly, to the styrene resin compositions, a bromine type flame retardant (e.g., ethylene bispentabromobenzene, tetrabromobisphenol-A derivatives, and polybromo-aliphatic ether derivatives) or a phosphate type flame retardant (e.g., resorcinol bis(diphenyl phosphate), and bisphenol-A bis(diphenyl phosphate)) is added as a first flame retardant. A second flame retardant may further be added, which enables a reduction of the quantity of the first flame retardant to be added. This can also prevent physical properties of the base polymer styrene resin compositions from lowering. In the case when the bromine type flame retardant is used as the first flame retardant, antimony trioxide may preferably be used as the second flame retardant because it is most effective.

In the case when the phosphate type flame retardant is used as the first flame retardant, PPE (polyphenylene ether) resin may be incorporated. This is also a method preferable in order to improve flame retardance. In this case, the PPE resin may be added in an amount of from 9 to 17 parts by weight based on 100 parts by weight of the styrene resin.

Compositional examples of the frame member materials may include the following examples.

To add the bromine type flame retardant as the first flame retardant in an amount of from 4 to 13 parts by weight, and further add the antimony trioxide as the second flame retardant or the like in an amount of from 0 to 5 parts by weight, both based on 100 parts by weight of the styrene resin.

To add the phosphate type flame retardant in an amount of from 4 to 13 parts by weight, and further add the PPE (polyphenylene ether) resin in an amount of from 9 to 17 parts by weight, both based on 100 parts by weight of the styrene resin.

Since the terpene type solvent dissolves the styrene materials as stated above, without limitation to the HIPS, usable as styrene resin compositions constituting the component parts of the cartridge are compositions making use of GPPS (general-purpose polystyrene not reinforced with rubber), compositions making use of ABS (acrylonitrile-butadiene-styrene copolymer), compositions making use of modified PPE (modified polyphenylene ether) resin, and styrene elastomers.

In this Embodiment 1, d-limonene was used as the terpene type solvent, and HIPS (a styrene polymer mixed with 8% by weight of polybutadiene rubber having an average particle diameter of 0.8 μm) was used as materials for the cleaning frame member and drum bearing.

To the HIPS, ethylene bispentabromobenzene was added as the first flame retardant in an amount of 9 parts by weight, and antimony trioxide as the second flame retardant in an amount of from 2.5 parts by weight, both based on 100 parts by weight of the styrene resin.

Incidentally, the above cleaning frame member and drum bearing were those having flame retardance on the UL-94 V2 rank.

Figure 7:
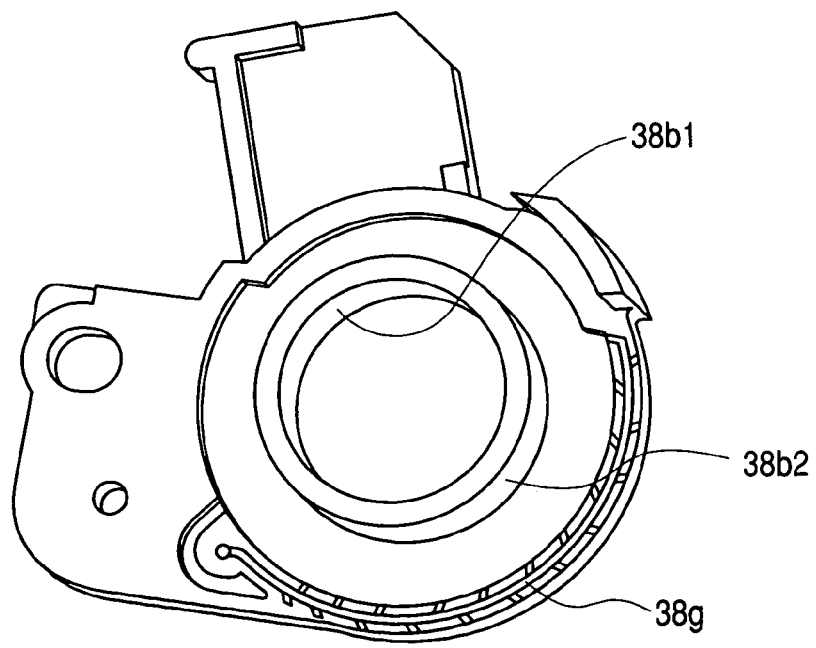
FIG. 7 is an enlarged view of a component part of the process cartridge according to an embodiment of the present invention.

The line cut (38g) of the drum bearing was provided as shown in FIG. 7. The line cut was 0.4 mm in width and 0.4 mm in depth, and the flow path was 0.16 mm$^2$ in sectional area. The d-limonene was fed to the joint surfaces by utilizing the capillary action. The d-limonene feed portion was 0.015 ml in capacity, and 0.010 ml of the d-limonene was fed.

Before the d-limonene was fed, the cleaning frame member and the drum bearing were screwed to bring them into a state that their surfaces to be joined were in light contact with each other (contact pressure: 5 g/cm$^2$). The surfaces to be finally joined were both flat surfaces, without providing any embossing.

Under the foregoing conditions, the cleaning frame member and the drum bearing were joined, whereupon joining with high positioning precision was achieved, and a cartridge was obtained which was almost free of deformation at the periphery of the joint and had a high rigidity.

In place of the line cut provided on the back of the drum bearing, the drum bearing was beveled (sectional area: 0.2 mm$^2$) as shown in FIG. 9, to provide the flow path, whereby good joining was achieved like the case when the line cut was provided.

(Joining of Toner Frame Member and Side Cover; Embodiment 2)

The joining of the toner frame member 11 and side covers 90 and 91 is described below (see FIGS. 1 and 12 to 14).

The toner frame member 11 described previously is provided with protrusions 50 and 51 for its positioning to the side cover 90(91: the side cover on the opposite side).

Figure 14:
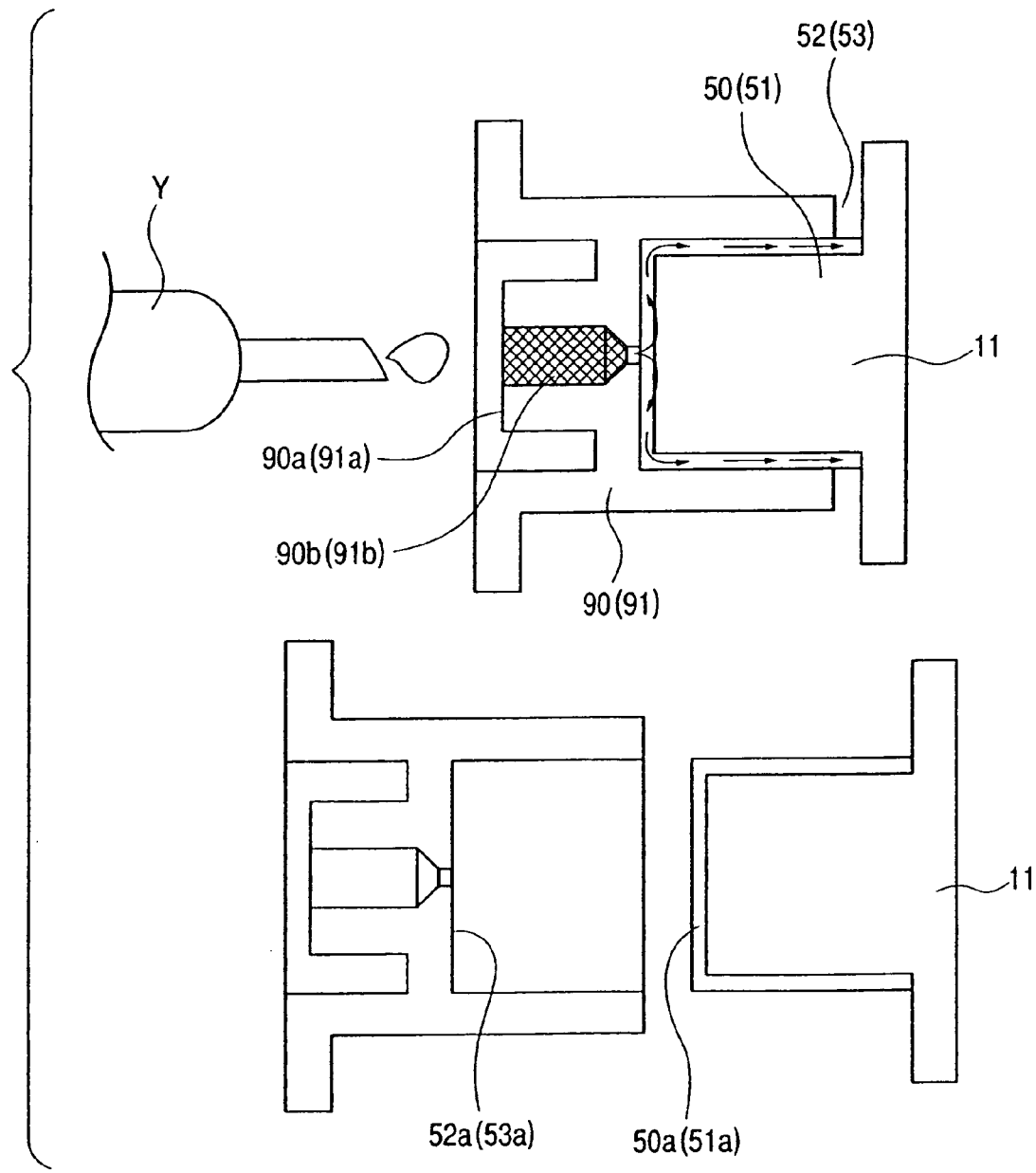
FIG. 14 is a partial vertical section of the process cartridge according to an embodiment of the present invention.
Figure 15:
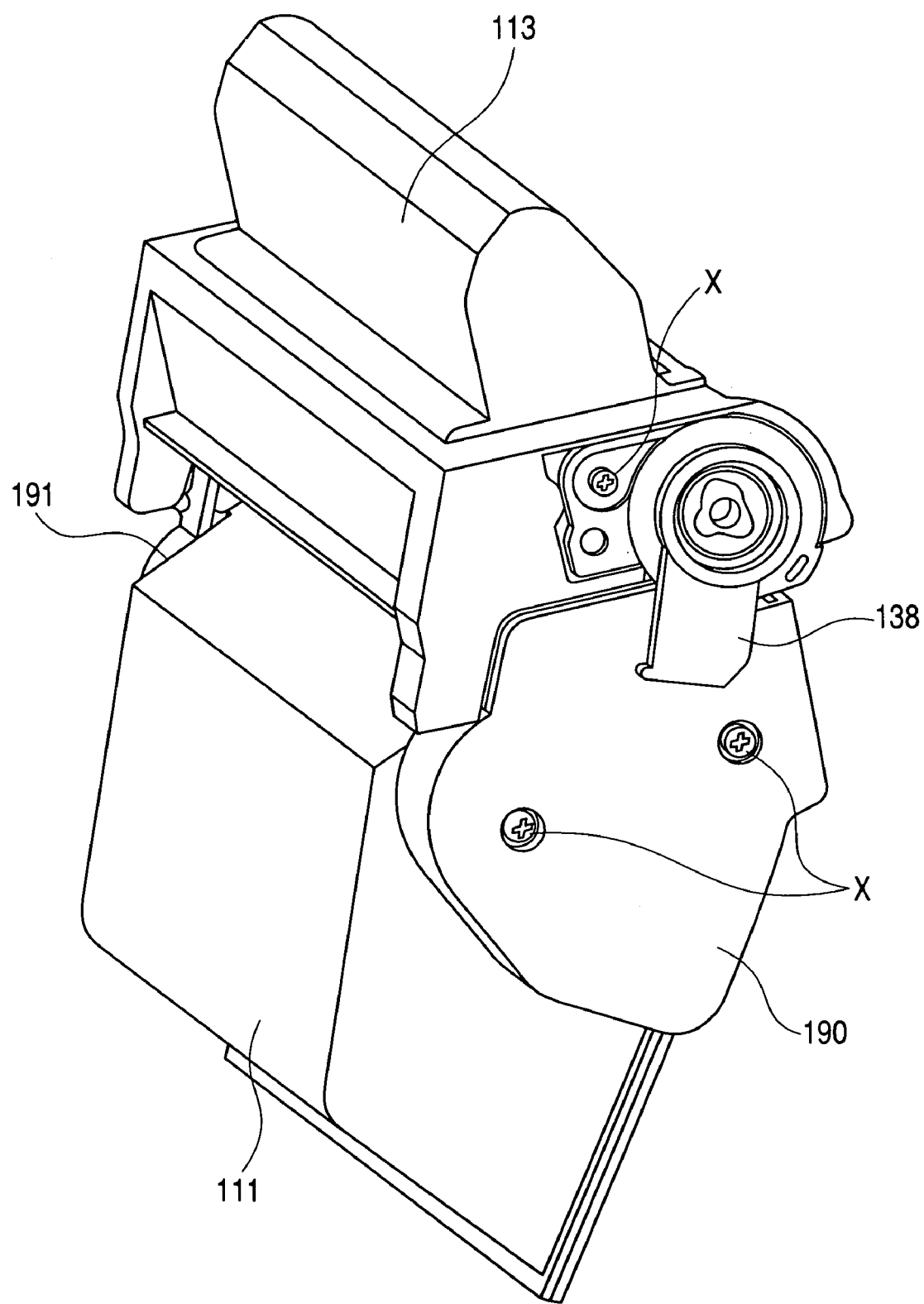
FIG. 15 is a perspective view of a conventional process cartridge.
Figure 16:
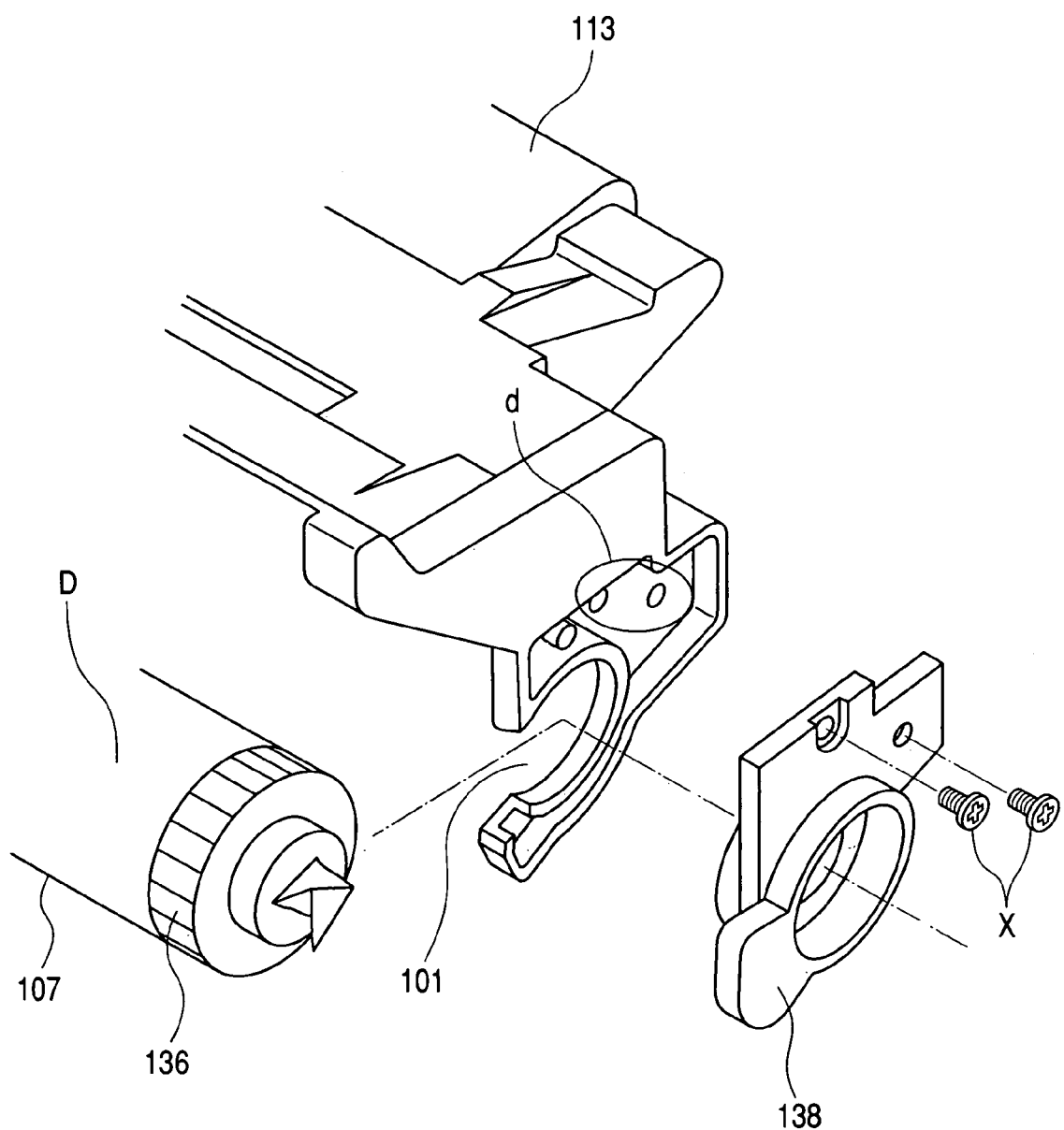
FIG. 16 is a schematic perspective view showing a partial structure of the conventional process cartridge.

Recesses 52 and 53 are also provided on the side cover 90(91) side correspondingly to the protrusions 50 and 51. As shown in FIG. 14, the protrusion 50 is fitted to the recess 52, where they serve as the center of rotation in the direction of an arrow g shown in FIG. 12, and the protrusion 51 is fitted to the recess 53, where they determine the rotational direction (position) of the toner frame member and side cover 90(91). Also, the positioning in the lengthwise direction is determined by making end faces 50a and 51a of the protrusions 50 and 51 come to the ends of the recesses 52 and 53 at their bottom faces 52a and 53a, respectively.

In this Embodiment 2, the side cover 90(91) forms an injection portion 90a(91a) through which the terpene type solvent is injected to the joint. The capacity of the injection portion may preferably be larger than the volume of the terpene type solvent to be injected from an injector Y.

The protrusions 50 and 51 are provided with slits 50b and 51b which communicate with injection openings 90b and 91b, respectively, and serve as a flow path (first flow path) for feeding the terpene type solvent (d-limonene) to the joint (joint surfaces) e. The terpene type solvent flows inside the slits by capillary action, and further flows by capillary action from the ends of the slits as shown by arrows in FIGS. 13 and 14 (second flow path) until it spreads over the whole joint surfaces.

In this Embodiment 2, the joint is formed by fitting, and hence the action of fitting force enables the coupled portions between the toner frame member 11 and the side covers 90 and 91 to be kept from separating before they are finally completely joined.

In this Embodiment 2, d-limonene was used as the terpene type solvent, and HIPS (a styrene polymer mixed with 8% by weight of polybutadiene rubber having an average particle diameter of 0.8 μm) was used as materials for the toner frame member and side covers.

To the HIPS, the phosphate type flame retardant resorcinol bis(diphenyl phosphate) was added as the first flame retardant in an amount of 7 parts by weight, and PPE (polyphenylene ether) was further added in an amount of 10 parts by weight, both based on 100 parts by weight of the styrene resin.

Incidentally, the above toner frame member and side covers were those having flame retardance on the UL-94 V2 rank.

Figure 13:
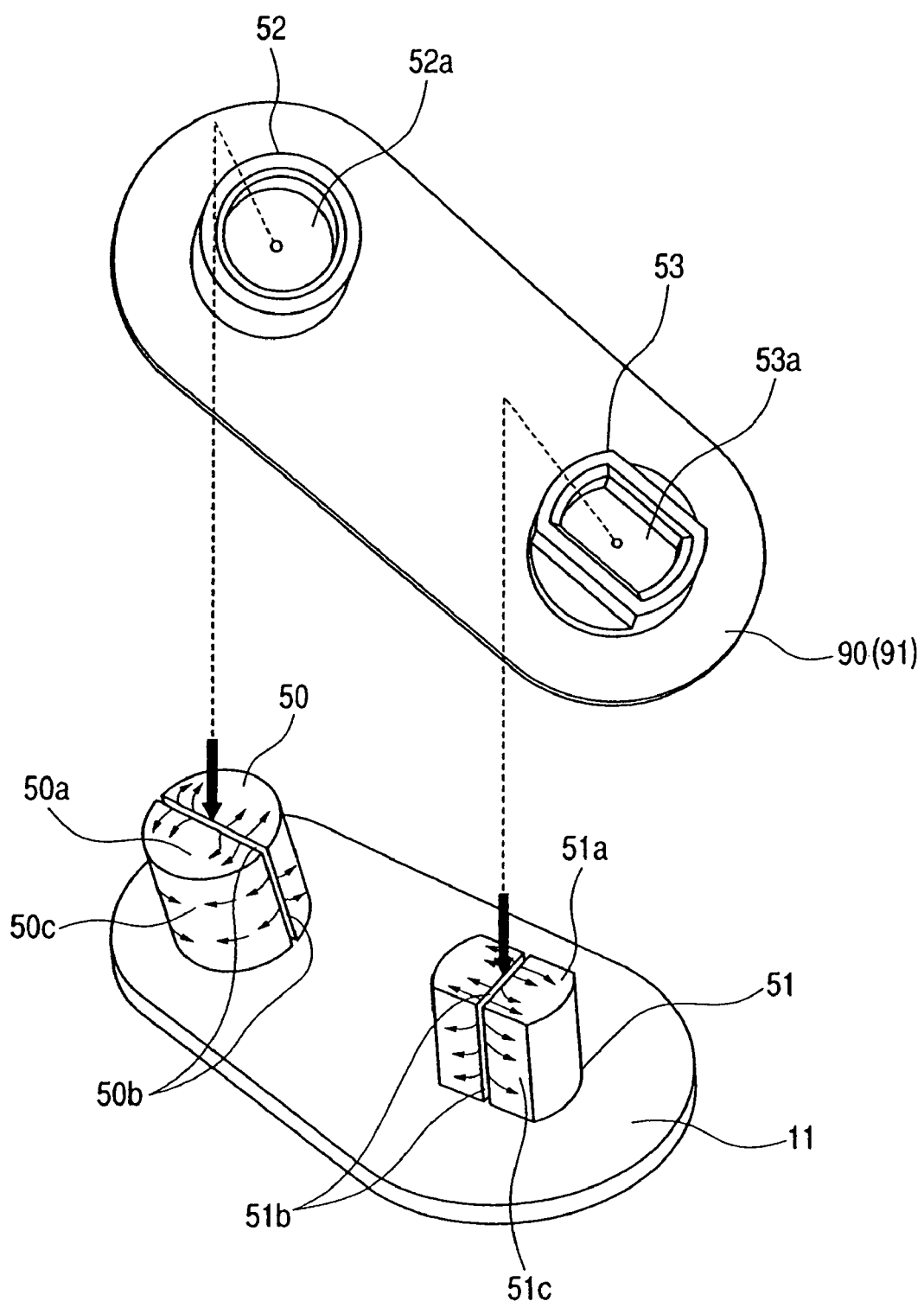
FIG. 13 is a schematic perspective view showing a partial structure of the process cartridge according to an embodiment of the present invention.

The slits of the toner frame member were provided as shown in FIG. 13. The slits were each 0.4 mm in width, and the flow path was 0.16 mm² in sectional area. The d-limonene was fed to the joint surfaces by utilizing capillary action. The d-limonene feed portion was 0.015 ml in capacity, and 0.010 ml of the d-limonene was fed.

The fitting was one corresponding to the Hg 9-level in the positioning precision (gap: 5 μm to 50 μm). In this case, the d-limonene can be fed to protrusion peripheral surfaces 50c and 51c as shown in FIG. 13 without requiring any fine unevenness such as embosses. In this state, the d-limonene was injected, which was then left for 10 minutes to join the both component parts.

Strength in the direction of peeling (separating) both component parts was measured. It, however, did not come about that they broke at their joint interface. Instead, the protrusions 50 and 51 of the toner frame member 11 were broken both at their roots. From this result, it was confirmed that the both stood joined firmly.

That is, also where the toner frame member and the side covers were jointed under the above conditions, joining in a high positioning precision was achieved, and a cartridge was obtained which was almost free of deformation at the periphery of the joint and had a high rigidity.

(Joining of Toner Container Component Parts; Embodiment 3)

In the toner container having at least a first component part formed of a first styrene resin composition and a second component part formed of a second styrene resin composition, the first component part and the second component part were joined with the terpene type solvent (d-limonene). As a result, joining in a high positioning precision was achieved, and a toner container was obtained which was almost free of deformation at the periphery of the joint and had a high rigidity.

Incidentally, the terpene type solvent was fed by utilizing the capillary. Also, HIPS (a styrene polymer mixed with 8% by weight of polybutadiene rubber having an average particle diameter of 0.8 μm) was used as materials for the respective component parts.

What is claimed is:

1. The cartridge comprising:
    a first component part formed of a first styrene resin composition; and
    a second component part formed of a second styrene resin composition:
        wherein said cartridge is detachably mountable to a main body of an electrophotographic image forming apparatus,
        wherein said first component part and said second component part are joined at joint surfaces;
        wherein said joint surfaces are terpene-type-solvent-welded joint surfaces disposed in contact with or in proximity to each other during feeding of a terpene-type solvent to at least a portion thereof before solvent welding,
        wherein at least one of the joint surface of said first component part and the joint surface of said second component part is provided with unevenness to facilitate the feeding of the terpene-type solvent,
        wherein said unevenness has a depth of from 20 μm to 40 μm as average roughness Rz.

2. The cartridge according to claim 1, wherein said joint surface of one of said first component part and said second component part has a protrusion and joint surface of the other one of said first component part and said second component part has a recess configured and positioned to receive said protrusion.

3. The cartridge according to claim 1, wherein the terpene type solvent is d-limonene.

4. The cartridge according to claim 1, wherein said joint surfaces are capillary-action-fed, terpene-type surfaces.

5. The cartridge according to claim 1, wherein said first styrene resin composition and said second styrene resin composition have identical compositions.

6. The cartridge according to claim 1, wherein at least one of said first component part and said second component part has an injection portion having an injection opening for injecting the terpene type solvent.

7. The cartridge according to claim 6, wherein at least one of said first component part and said second component part is provided with a line cut, a slit or a beveled portion, for forming a flow path communicating with said injection opening, and is so constituted to permit the terpene type solvent to be fed through the flow path to at least part of the joint surfaces before fastening by solvent welding.

8. The cartridge according to claim 7, wherein said flow path is from 0.01 mm² to 4.0 mm² in sectional area.

9. The cartridge according to claim 1, wherein said first component part and said second component part form an injection portion having an injection opening for injecting the terpene type solvent, at a portion where both said first component part and said second component part are in contact with or in proximity to each other.

10. The cartridge according to claim 9, wherein at least one of said first component part and said second component part is provided with a line cut, a slit or a beveled portion, for forming a flow path communicating with said injection opening, and is so constituted to permit the terpene type solvent to be fed through the flow path to at least part of the joint surfaces before fastening by solvent welding.

11. The cartridge according to claim 10, wherein said flow path is from 0.01 mm$^2$ to 4.0 mm$^2$ in sectional area.

12. The cartridge according to claim 1, wherein said first styrene resin composition and said second styrene resin composition are each a mixture of a styrene resin and a rubbery polymer or a mixture of a styrene resin and a rubbery copolymer.

13. The cartridge according to claim 12, wherein said rubbery polymer or said rubbery copolymer comprises particles having an average particle diameter of from 0.5 µm to 3.0 µm.

14. The cartridge according to claim 12, wherein said rubbery polymer or said rubbery copolymer is a polymer selected from the group consisting of polybutadiene, a styrene-butadiene copolymer, polyisoprene, a butadiene-isoprene copolymer, natural rubber and an ethylene-propylene copolymer.

15. The cartridge comprising:
a first component part formed of a first styrene resin composition; and
a second component part formed of a second styrene resin composition;
wherein said cartridge is detachably mountable to a main body of an electrophotographic image forming apparatus,
wherein said first component part and said second component part are joined at joint surfaces;
wherein said joint surfaces are terpene-type-solvent-welded joint surfaces disposed in contact with or in proximity to each other during feeding of a terpene-type solvent to at least a portion thereof before solvent welding, and
wherein said first component part is a bearing member which supports an image bearing member and said second component part is a frame member which supports said bearing member.

16. The cartridge according to claim 15, wherein the terpene type solvent is d-limonene.

17. The cartridge according to claim 15, wherein said joint surfaces are capillary-action-fed, terpene-type surfaces.

18. The cartridge according to claim 15, wherein said joint surface of one of said first component part and said second component part has a protrusion and joint surface of the other one of said first component part and said second component part has a recess configured and positioned to receive said protrusion.

19. The cartridge according to claim 15, wherein at least one of said first component part and said second component part has an injection portion having an injection opening for injecting the terpene type solvent.

20. The cartridge according to claim 19, wherein at least one of said first component part and said second component part is provided with a line cut, a slit or a beveled portion, for forming a flow path communicating with said injection opening, and is so constituted to permit the terpene type solvent to be fed through the flow path to at least part of the joint surfaces before fastening by solvent welding.

21. The cartridge according to claim 20, wherein said flow path is from 0.01 mm$^2$ to 4.0 mm$^2$ in sectional area.

22. The cartridge according to claim 15, wherein said first component part and said second component part form an injection portion having an injection opening for injecting the terpene type solvent, at a portion where both said first component part and said second component part are in contact with or in proximity to each other.

23. The cartridge according to claim 22, wherein at least one of said first component part and said second component part is provided with a line cut, a slit or a beveled portion, for forming a flow path communicating with said injection opening, and is so constituted to permit the terpene type solvent to be fed through the flow path to at least part of the joint surfaces before fastening by solvent welding.

24. The cartridge according to claim 23, wherein said flow path is from 0.01 mm$^2$ to 4.0 mm$^2$ in sectional area.

25. The cartridge according to claim 15, wherein said first styrene resin composition and said second styrene resin composition have identical compositions.

26. The cartridge according to claim 15, wherein said first styrene resin composition and said second styrene resin composition are each a mixture of a styrene resin and a rubbery polymer or a mixture of a styrene resin and a rubbery copolymer.

27. The cartridge according to claim 26, wherein said rubbery polymer or said rubbery copolymer comprises particles having an average particle diameter of from 0.5 µm to 3.0 µm.

28. The cartridge according to claim 26, wherein said rubbery polymer or said rubbery copolymer is a polymer selected from the group consisting of polybutadiene, a styrene-butadiene copolymer, polyisoprene, a butadiene-isoprene copolymer, natural rubber and an ethylene-propylene copolymer.

* * * * *

UNITED STATES PATENT AND TRADEMARK OFFICE
CERTIFICATE OF CORRECTION

PATENT NO. : 7,099,607 B2
APPLICATION NO. : 10/866115
DATED : August 29, 2006
INVENTOR(S) : Akira Suzuki et al.

It is certified that error appears in the above-identified patent and that said Letters Patent is hereby corrected as shown below:

COLUMN 7:
Line 51, "can not" should read --cannot--.

COLUMN 12:
Line 20, "The" should read --A--.
Line 24, "composition:" should read --composition,--.
Line 38, "solvent," should read --solvent, and--.

COLUMN 13:
Line 31, "The" should read --A--.

Signed and Sealed this

Thirtieth Day of June, 2009

JOHN DOLL
*Acting Director of the United States Patent and Trademark Office*